: 2,885,376
Patented May 5, 1959

2,885,376
CHLORINATED PINENE-FORMALDEHYDE REACTION PRODUCT AND COMPOSITION CONTAINING SAME

Flavio J. Grasso, Union City, and Walter S. Dow, Jr., Bloomfield, N.J., assignors, by mesne assignments, to Harvel Research Corporation, a corporation of New Jersey No Drawing. Application June 30, 1953
Serial No. 365,266

3 Claims. (Cl. 260—29.8)

This invention relates to novel compositions of matter and to methods of making the same and also to compositions of which one or more of them may be components. In one of its more specific aspects the invention is directed to novel derivatives of beta-pinene-formaldehyde organic reaction products, to methods for making them and to novel compositions in which one or more of them are components.

Beta-pinene may be reacted with formaldehyde to provide condensation reaction products which are normally liquid. In general such reactions are carried out in the presence of an acidic condensing agent as disclosed in the U.S. patent to M. T. Harvey, 2,350,230, of May 30, 1944. Briefly, the method entails at elevated temperature reacting the pinene or a pinene containing material, such as turpentine, with formaldehyde in aqueous solution in the presence of an acidic catalyst. The mole ratio of beta-pinene to the formaldehyde in the reacting mixture may be 1 mole of the pinene to 1–7 moles of formaldehyde and for good results the mole ratio of the pinene to the acidic catalyst is 1 mole of pinene to .01–.1 mole of catalyst.

The following is a specific example of the method for producing beta-pinene-formaldehyde reaction products and is given merely by way of illustrating a method for producing one of the starting materials.

*Example 1*

576 pounds of beta-pinene, 1512 pounds of aqueous solution of formaldehyde (about 37.5% concentration) and 23 pounds of hydrochloric acid were charged into a reaction vessel having a reflux condenser. The mix was then brought to and maintained in the state of boiling for about 5 hours and then cooled to room temperature when it was found to have separated into two layers, (b) a watery layer and (a) a straw colored oil-like liquid hereinafter known as product IB. The watery layer was removed from the oil-like layer IB and then the oil-like layer IB was heated to about 325° F. while under vacuum of about 28" of mercury and thus maintained about 3–4 hours. The distillate was collected and the remaining high boiling fraction, hereinafter called product IBR and weighing about 880 pounds was found to be substantially completely dehydrated, substantially free of unreacted pinene and formaldehyde and of the lower volatiles of pinene-formaldehyde reaction products which were now contained in the distillate. The distillate upon standing separated into two layers, an aqueous layer and an oil-like layer which were subsequently removed from each other, and this oil-like layer is hereinafter termed product IBD. Instead of heating the oil-like layer IB at such elevated temperatures to obtain a distillate containing an appreciable amount of pinene-formaldehyde reaction products, the layer IB may be heated under a high vacuum to a temperature of about 175° F. and maintained under those conditions until substantially complete dehydration is effected, with removal of free formaldehyde and pinene which may be present, but without distilling over any appreciable amount of the pinene-formaldehyde organic reaction products therein, and such dehydrated oil-like layer is still liquid and is known as product IBC.

*Example 2*

Employ the same procedure as that followed in Example 1, except that the ratio of beta-pinene to formaldehyde is varied within the limits heretofore set forth and the ratio of beta-pinene to the catalyst may also vary within the limits set forth to provide a wide variety of oil-like layers of the IB type and hereinafter known as IIB, dehydrated oil-like layers of the IBC type hereinafter known as IIBC, high boiling fractions of the IBR type hereinafter known as IIBR, and oil-like layers of the IBD type from the distillate and hereinafter known as IIBD. All of these products IIB, IIBC, IIBR and IIBD are composed chiefly of pinene-formaldehyde reaction products and particularly those of the IIBR type have boiling points of at least 175° C., and those of the IIBC type are composed chiefly of reaction products having boiling points above 175° C.

*Example 3*

In said U.S. Patent 2,350,250 there are Examples 1–5 disclosing the use of turpentine and formaldehyde in amounts such that there are present in the mixture 1 mole of pinene for 1–5 moles of formaldehyde respectively. The oil-like layers (b) of said examples hereinafter known as products IIIB, IVB, VB, VIB, and VIIB respectively may also be dehydrated in the manner set forth in Example 1 to provide respective dehydrated products IIIBC, IVBC, VBC, VIBC and VIIBC, high boiling fractions IIIBR, IVBR, VBR, VIBR and VIIBR respectively, and oil-like layers IIIBC, IVBD, VBD, VIBD and VIIBD from the respective distillates.

According to this invention, the reaction products of beta-pinene and formaldehyde produced under acidic conditions, examples of which are products IB to VIIB, may be chlorinated to provide a number of different and highly useful products finding application in a number of different fields. It is preferred that the products IB–VIIB be first dehydrated before chlorination, and in order to obtain an even wider variety of chlorinated products, it is preferred to obtain fractions of IB–VIIB, such as those exemplified by IBR–VIIBR and IBD–VIIBD, which are then separately chlorinated. The chlorination of said beta-pinene-formaldehyde organic reaction products may be easily and readily accomplished by merely subjecting them to free chlorine, generally by passing free chlorine therein until the amount of chlorine combined is at least about 3 parts by weight of chlorine for each 100 parts by weight of the product subjected to the free chlorine, and for most purposes may be as high as approximately 20 parts by weight of chlorine for each 100 parts of the product subjected to the free chlorine. If desired, the organic reaction product may be chlorinated while dissolved in a solvent such as ethyl alcohol.

The following Examples 4 and 5 are given merely by way of illustrating a method of chlorinating and is not to be taken by way of a limiting sense, all parts being given by weight unless otherwise specifically set forth. Moreover, because of the extreme simplicity of the method to be employed, only this limited number of specific examples are given because they are more than sufficient to teach those in the art the invention herein set forth.

*Example 4*

500 grams product IBR is placed into a glass vessel having a condenser at the upper end thereof. Free chlorine gas is admitted slowly into said mass of product IBR. The temperature of the mass immediately begins to rise from room temperature. As the chlorine gas is continuously and slowly fed into said mass, the temperature thereof continues to rise until at the end of 75 minutes of chlorine addition it reaches about 238° F. The temperature of the mass remains the same for the next 15 minutes of chlorine addition and during the next 15 minutes of chlorine addition the temperature starts to fall and reaches 233° F. at the end of that period, when the chlorine feed is cut off. The mass is allowed to cool to room temperature and is a heavy viscous mass weighing 541.9 grams. When this heavy viscous mass is maintained at 325° F. an aqueous distillate comes off, and the distillate weighs 94.7 grams leaving behind a thick, yet liquid residual fraction measuring 447.3 grams, containing about 10% by weight of combined chlorine, and hereinafter known as IBRA.

*Example 5*

500 grams of IBD is placed in a glass vessel having a condenser at the upper end thereof. Free chlorine is admitted slowly and continuously into said mass of product IBD and the temperature of the mass begins to rise. As the chlorine gas is slowly and continuously fed into said mass, the temperature thereof continues to rise until it reaches about 140° C. The temperature remains the same for a period of about 30 minutes thereafter of chlorine addition, and at the end of that period it begins to fall. When the temperature drops to 135° C., the chlorine feed is cut off. The resultant mass, hereinafter known as product IBDA, is a clear, light body liquid weighing 591 grams and containing about 10% by weight of combined chlorine.

*Example 6*

500 parts of product IBC are placed in a glass vessel having a condenser at the upper end thereof. Free chlorine is admitted slowly and continuously into said mass of product IBC and the temperature of the mass begins to rise and continues to rise and reaches a maximum temperature which remains for a substantial period and then begins to fall. When the temperature of the mass falls to a value of 5–10° F. from maximum, the chlorine feed is shut off. The resultant chlorinated mass is liquid and has a combined chlorine content of approximately 12% by weight and is hereinafter known as product IBCA.

All of the various BR and BD products may be chlorinated in the manner heretofore set forth in the chlorination of IBD and IBR and, if desired, the various products IB–VIIB may be chlorinated in like manner as was IBC without first separating them in fractions such as the BR and BD fractions. In all the chlorination procedures, the chlorine may be slowly and continuously fed into the mass to be chlorinated until a maximum temperature is attained and thereafter until the temperature of the mass drops about 5–10° F. Of course, it is also within the purview of this invention to terminate the chlorine addition after a predetermined amount less than maximum is added to the mass to be chlorinated.

All of the various chlorinated products of this invention may be employed in combination with various (X) normally solid vinyl compounds, such as polymers of vinyl acetate, polymers of vinyl chloride, copolymers of vinyl chloride and vinyl acetate and/or with (Y) normally solid materials such as natural rubber, reclaimed rubber, homopolymers of butadiene, rubbery polymers of chloroprene, rubbery copolymers of butadiene and styrene, rubbery copolymers of butadiene and acrylonitrile. They act as softening or tackifying agents for said vinyl compounds and also for said other normally solid materials. When used with said materials (Y) the ratio by weight of (Y) to said chlorinated products may vary over wide limits depending upon the characteristics desired in the end products and generally is 100 parts of (Y) to 5–50 parts of said chlorinated products. They may be combined with each other in a mixer, such as a Banbury, or they may be milled together generally with other materials employed in the compounding of the particular material (Y) employed and the method of combining is that used in the compounding of the particular material (Y) employed as known to the art. The chlorinated products may be heat combined with the various vinyl compounds (X) by the use of heat to produce masses in the nature of gels or rubbery type masses (Z). In general, the ratio by weight of (X) to the chlorinated products is in the ratio range of about 1–10 to 1–1, depending upon the rigidity of the gel-type product desired. For most purposes, the desired product (X) or mixtures thereof together with a combination of one or more of the chlorinated products in the desired proportion are mixed together and heated to about 320° F., whereupon they become intimately combined and such combination is in the nature of a solution. Then the mass is allowed to cool to room temperature and will be in the nature of a gel. Such resultant products may be combined with one or a combination of two or more of said materials (Y) and act as softeners and tackifiers and incorporate the various vinyl compounds therein. Instead of first forming said gel-like masses and then compounding them with (Y), the chlorinated products and the vinyl compounds may be added separately to the material (Y) with which they are to be compounded. These various chlorinated products also serve as plasticizers for the various epoxy resins. These various chlorinated products when combined with (X) provide gel-like products which are more fire resistant, have a reduced tendency to bleed and also exhibit a lower isopropyl alcohol-solubility factor when compared with such gel-like products produced with the unchlorinated beta-pinene reaction products of the prior art.

The following are examples given by way of illustrating other compositions of this invention, all parts given by weight unless otherwise specified.

*Example 7*

500 parts of product IBRA and 100 parts of "Vinylite VYNW," a copolymer of vinyl chloride and vinyl acetate, were heated together at about 320° F. until they appeared to be in solution, and then the mass was poured into pans and allowed to cool to room temperature and found to be of a gel-like or rubber-like nature and this product is hereinafter known as IBRAC.

*Example 8*

Employing the same procedure as that of Example 7, but employing 500 parts of product IBRA and 200 parts of a normally solid polymer of vinyl chloride, there was obtained a gel-like or rubbery-type mass known hereinafter as IBRAP which was much stiffer than product IBRAC.

*Example 9*

Employing the same procedure as that of Example 7, but using 500 parts of product IBDA and 100 parts of "Vinylite VYNW," there was obtained a gel-like or rubber-like mass hereinafter known as product IBDAP.

*Example 10*

Employing the same procedure as that of Example 7, but using 500 parts of product IBDA and 200 parts of a normally solid polymer of polyvinyl chloride, there was obtained a gel-like or rubber-like mass hereinafter known as product IBDAP.

*Example 11*

400 parts of product IBCA was heated to 320° F. and maintained at that temperature for about 30 minutes. Then there was added thereto 100 parts of a normally solid polymer of polyvinyl chloride and this mix was maintained at that temperature for about 1 hour for substantial solution, and the resultant mass was poured into pans and cooled to room temperature and was in the nature of a gel-like or rubbery mass.

Of course, it is to be understood that other chlorinated beta-pinene-formaldehyde reaction products whose chlorine contents are different from those employed in the foregoing Examples 7–11 may be employed in place of the specific chlorinated reaction products therein employed. Moreover, the ratio of the chlorinated products to the vinyl compounds may be varied and in this connection, the lower the ratio the more rigid the gel-like mass.

*Example 12*

Using the same milling procedure and additives as those known to the art in the compounding of normally solid copolymers of butadiene and styrene, but first milling into 100 parts of one of said normally solid copolymers to uniformity approximately 10 parts of product IBRA, the milling procedure was considerably improved as was the resultant stock after curing.

The various chlorinated products can be substituted for those of Example 12 and in addition the various other products (Y) may be substituted for the copolymer of butadiene and styrene, novel and highly useful rubbery materials may be obtained which find use as sheeting, insulator tubing, typewriter platens, printing rolls, etc.

*Example 13*

Using the same milling procedure and additives as those known to the art in the compounding of normally solid polymers of butadiene and styrene; and first milling 20 parts of product IBDAP, the resultant stock after curing was found to have better ageing and tear strength.

In such type compositions also, any of the other materials (Y) may be substituted for the copolymer employed in Example 13 and any of the other gel-like masses may be substituted for that used in said example. These various products find application as electrical insulator tubing, sheeting, printing rolls, etc.

*Example 14*

Employing the same milling procedure and compounds employed in the art for the compounding of a normally solid copolymer of butadiene and styrene; but first milling in 100 parts thereof 10 parts of a normally solid copolymer of vinyl chloride and vinyl acetate in the powdered condition and also 10 parts of product IBRA, which may be added together and if not the latter first; then after curing, the product will be found to have improved ageing and tear resistance.

The various chlorinated products may be substituted for that of Example 14, and the various materials (Y) may be substituted for that of said example as may be the various other vinyl compounds for that set forth to provide rubbery materials finding application for insulator tubing, printing rolls, sheets and platens.

It is to be understood that the following claims are intended to cover all the generic and specific features of the invention herein described and all statements of the scope of the invention which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

We claim:

1. A chlorinated beta-pinene-formaldehyde organic reaction product containing an amount of chlorine measuring 3 to 20% by weight of said pinene-formaldehyde reaction product before chlorination; said pinene-formaldehyde reaction product before chlorination being normally liquid and produced by heating a mixture comprising pinene, an aqueous solution of formaldehyde and an acid catalyst, the mole ratio of said pinene to said formaldehyde in said mixture being between about 1 to 1 and 1 to 7, the mole ratio of said pinene to said acid catalyst in said mixture being between about 1 to .1 to .01, said chlorinated beta-pinene-formaldehyde organic reaction product produced by contacting with free chlorine said pinene-formaldehyde organic reaction product.

2. A novel composition of matter comprising (I) a normally solid material selected from the group consisting of natural rubber, reclaimed rubber, homopolymers of butadiene, polymers of chloroprene, copolymers of butadiene and styrene, copolymers of butadiene and acrylonitrile, polyvinyl chloride, polyvinyl acetate, copolymers of vinyl chloride and vinyl acetate and mixtures thereof intimately combined with (II) a chlorinated pinene-formaldehyde organic reaction product defined in claim 1.

3. A novel composition of matter comprising normally solid polyvinyl chloride intimately combined with a chlorinated pinene-formaldehyde organic reaction product defined in claim 1.

References Cited in the file of this patent

UNITED STATES PATENTS

| | | |
|---|---|---|
| 2,124,851 | Fitzky | July 26, 1938 |
| 2,323,129 | Harvey | June 29, 1943 |
| 2,327,422 | Harvey | Aug. 24, 1943 |
| 2,333,513 | Berberich et al. | Nov. 2, 1943 |
| 2,350,230 | Harvey | May 30, 1944 |
| 2,412,216 | Harvey | Dec. 10, 1946 |
| 2,631,168 | Ross et al. | Mar. 10, 1953 |